(12) United States Patent
Eguchi et al.

(10) Patent No.: US 9,207,370 B2
(45) Date of Patent: Dec. 8, 2015

(54) ANTI-GLARE FILM, POLARIZING PLATE AND IMAGE DISPLAY DEVICE

(71) Applicant: DAI NIPPON PRINTING CO., LTD., Tokyo (JP)

(72) Inventors: Junya Eguchi, Tokyo (JP); Tasuku Kitamura, Tokyo (JP); Shoichiro Ogumi, Tokyo (JP); Gen Furui, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 14/368,125

(22) PCT Filed: Dec. 26, 2012

(86) PCT No.: PCT/JP2012/083629
§ 371 (c)(1),
(2) Date: Jun. 23, 2014

(87) PCT Pub. No.: WO2013/099931
PCT Pub. Date: Jul. 4, 2013

(65) Prior Publication Data
US 2014/0340755 A1    Nov. 20, 2014

(30) Foreign Application Priority Data
Dec. 26, 2011 (JP) .................................. 2011-284259

(51) Int. Cl.
G02B 27/00 (2006.01)
G02B 5/02 (2006.01)
G02B 1/118 (2015.01)
G02B 5/30 (2006.01)
G02F 1/1335 (2006.01)

(52) U.S. Cl.
CPC .............. *G02B 5/0242* (2013.01); *G02B 1/118* (2013.01); *G02B 5/0226* (2013.01); *G02B 5/0294* (2013.01); *G02B 5/3025* (2013.01);

(Continued)

(58) Field of Classification Search
CPC ....................................................... G02B 5/0294
USPC ................................................... 359/601, 613
See application file for complete search history.

(56) References Cited

U.S. PATENT DOCUMENTS

2007/0291363 A1* 12/2007 Asakura et al. ............... 359/586
2010/0091374 A1   4/2010 Iwata et al.

FOREIGN PATENT DOCUMENTS

JP    6-018706    1/1994
JP    10-020103   1/1998

(Continued)

*Primary Examiner* — William Choi
(74) *Attorney, Agent, or Firm* — Hamre, Schumann, Mueller & Larson, P.C.

(57) ABSTRACT

The present invention aims to provide an antiglare film that can be thinned without lowering the hard coat properties and antiglare properties, highly suppress scintillation and white muddiness, and provide display images with a high contrast. The antiglare film includes a light-transmitting substrate and an antiglare layer with surface roughness on one face of the light-transmitting substrate, wherein the antiglare layer contains silica fine particles, organic fine particles, and a binder resin, part of the silica fine particles form agglomerates and the agglomerates are contained in the antiglare layer sparsely and densely, the agglomerates of the silica fine particles are densely distributed around the organic fine particles, and part of the agglomerates densely distributed around the organic fine particles are attached to the surface of the organic fine particles and/or have some of the silica fine particles contained in the agglomerates impregnate the inside of the organic fine particles.

14 Claims, 4 Drawing Sheets

(52) U.S. Cl.
CPC ......... *G02B5/3033* (2013.01); *G02F 1/133502* (2013.01); *G02F 1/133528* (2013.01)

(56) References Cited

FOREIGN PATENT DOCUMENTS

| | | |
|---|---|---|
| JP | 2002-327036 | 11/2002 |
| JP | 2003-183410 | 7/2003 |
| JP | 2004-151642 | 5/2004 |
| JP | 2007-196421 | 8/2007 |
| JP | 2007-256766 | 10/2007 |
| JP | 2008-026883 | 2/2008 |
| JP | 2008-046497 | 2/2008 |
| JP | 2008-203836 | 9/2008 |
| JP | 2008-262190 | 10/2008 |
| JP | 2008-287072 | 11/2008 |
| JP | 2009-204728 | 9/2009 |
| JP | 2010-282023 | 12/2010 |
| WO | 2006/088202 | 8/2006 |

* cited by examiner

Average angle of inclination  $\theta a$  (Kosaka Laboratory Ltd.)  Roughness curve Standard length L $$\theta a = \tan^{-1}\left(\frac{h_1 + h_2 + h_3 + \cdots\cdots + h_n}{L}\right)$$

ANTI-GLARE FILM, POLARIZING PLATE AND IMAGE DISPLAY DEVICE

TECHNICAL FIELD

The present invention relates to an antiglare film, a polarizer, and an image display device.

BACKGROUND ART

Image display devices such as cathode-ray tube (CRT) display devices, liquid crystal display devices (LCD), plasma display panels (PDP), electroluminescent display devices (ELD), electronic paper displays, tablet PCs, and touch panels are commonly provided with an optical layered body for antireflection on the outermost surface.

Such optical layered bodies for antireflection suppress reflection of images and decrease the reflectance by scattering or interference of light.

A known optical layered body for anti-reflection is an antiglare film including an antiglare layer having surface roughness on a transparent substrate. The surface roughness of the antiglare film scatters external light, thereby preventing a decrease in visibility due to reflection of external light and reflection of images. Such an optical layered body is usually disposed at the outermost surface of an image display device, and therefore needs to have hard coating properties in order to prevent the device from being scratched during handling.

A known conventional antiglare film is a film including a light-transmitting substrate and an antiglare layer formed on the surface of the substrate by applying a resin containing a filler such as silicon dioxide (silica) (see Patent Literature 1 and Patent Literatures 2, for example).

Examples of the antiglare film include a film in which surface roughness on an antiglare layer is formed by agglomeration of particles such as cohesive silica; a film in which surface roughness on a layer is formed using a resin containing an organic filler; and a film in which surface roughness is transferred on the surface of a layer by laminating a film with projections and depressions.

Such conventional antiglare films all have a light diffusion function and an antiglare function due to the effect of a surface shape of the antiglare layer. In order to improve such antiglare properties, the surface roughness needs to be steep and dense. However, if the surface roughness is steep and dense, the haze of a coating increases to cause white muddiness, which results in a decrease in contrast of display images.

Further, the conventional antiglare films generate a flicker, so-called scintillation, on the surface, problematically decreasing the visibility of a display screen. Scintillation is a phenomenon that minute nonuniformity of brightness appears on a screen surface when an image display device is turned on and transmitted light from the rear side reaches the screen, and the position of the nonuniformity seems to shift when a viewer changes the viewing angle. The phenomenon is particularly noticeable in the case of full white display and full green display.

Particularly in recent years, a demand for high contrast has been raised because of an increase in occasions to see high-resolution images, such as movies, at home. An exemplary known means to meet the demand is an antiglare film prepared by layering a hard coat layer and an antiglare layer (see Patent Literature 3, for example). Such a layered anti-reflection film suppresses scintillation and white muddiness while maintaining the hard coat properties and antiglare properties by smoothing fine projections and depressions on the surface of the antiglare layer using the same resin as that used for the hard coat layer and thereby making the projections and depressions have less undulation and wider intervals. However, such a film has a thickness of 10 μm or more, and thus fails to sufficiently satisfy the recent demand for reducing thickness of antiglare films.

In a case where surface roughness on a layer is formed using organic fine particles or inorganic fine particles solely, thinning of an antiglare film may cause a case where excessive fine particles are disposed in an upper part of the antiglare layer or the fine particles may be agglomerated in the height direction. As a result, the surface roughness becomes too rough and scintillation or white muddiness is caused. If the average particle size of the organic fine particles or inorganic fine particles is reduced to moderate the surface roughness for the purpose of solving the above problem, the surface roughness tends to be rather too gentle, and the antiglare properties are likely to be deteriorated. Consequently, high quality products cannot be stably obtained. Accordingly, it has been desired to provide an antiglare film including an antiglare single layer with a moderate surface roughness capable of sufficiently suppressing scintillation and white muddiness in a bright room and excellent in contrast in a dark room while maintaining hard coating properties and antiglare properties.

CITATION LIST

Patent Literature

Patent Literature 1: JP-A H06-18706
Patent Literature 2: JP-A H10-20103
Patent Literature 3: WO 2006/088202

SUMMARY OF INVENTION

Technical Problem

The present invention has been devised in consideration of the state of the art, and aims to provide an antiglare film that can be thinned without lowering the hard coat properties and antiglare properties, highly suppress scintillation and white muddiness, and provide display images with a high contrast; and a polarizer and an image display device each including the antiglare film.

Solution to Problem

The present invention relates to an antiglare film comprising: a light-transmitting substrate; and an antiglare layer with surface roughness on one face of the light-transmitting substrate, wherein the antiglare layer contains silica fine particles, organic fine particles, and a binder resin, part of the silica fine particles forms agglomerates and the agglomerates are contained in the antiglare layer sparsely and densely, the agglomerates of the silica fine particles are densely distributed around the organic fine particles, and part of the agglomerates densely distributed around the organic fine particles are attached to the surface of the organic fine particles and/or have some of the silica fine particles contained in the agglomerates impregnate the inside of the organic fine particles.

In the antiglare film of the present invention, assuming that the projections and depressions on the surface of the antiglare layer have an average spacing represented by Sm, an average angle of inclination represented by θa, an arithmetic mean roughness represented by Ra, and a ten point mean roughness represented by Rz, all preferably satisfy the following inequalities:

50 μm<Sm<600 μm;
0.1°<θa<1.5°;
0.02 μm<Ra<0.25 μm; and
0.30 μm<Rz<2.00 μm.

Preferably, the antiglare layer has a thickness of 2.0 to 7.0 μm, and the organic fine particles have an average particle size of 20 to 60% relative to the thickness of the antiglare layer.

Preferably, the silica fine particles are surface-treated and the agglomerates of the silica fine particles have an average particle size of 100 nm to 1 μm.

Preferably, the binder resin mainly contains a polyfunctional acrylate monomer including no hydroxy in a molecule.

Preferably, the organic fine particles are prepared from at least one material selected from the group consisting of acryl resins, polystyrene resins, styrene-acrylic copolymers, polyethylene resins, epoxy resins, silicone resins, polyvinylidene fluoride resins, and polyethylene fluoride resins. The organic fine particles are preferably surface-hydrophilized.

Preferably, the antiglare layer is formed using a composition for an antiglare layer containing the organic fine particles, the silica fine particles, a monomer component of the binder resin, and a solvent.

Preferably, the solvent contains isopropyl alcohol and the isopropyl alcohol content in the solvent is at least 20% by mass.

The present invention also provides a polarizer comprising a polarizing element, wherein the polarizer has the antiglare film described above on a surface of the polarizing element.

The present invention further provides an image display device comprising the antiglare film described above or the polarizer described above.

The present invention is specifically described in the following.

Intensive studies by the present inventors on an antiglare film including an antiglare layer with surface roughness on a light-transmitting substrate show that an antiglare layer containing silica fine particles and organic fine particles in a specific dispersion state may have more moderate surface roughness compared to a case where surface roughness is formed on an antiglare layer using fine particles of a single type (e.g., organic fine particles). As a result, a resulting antiglare film can be thinned without lowering the hard coating properties and antiglare properties to sufficiently suppress scintillation and white muddiness. Thus, the present invention has been completed.

The antiglare film of the present invention includes an antiglare layer having surface roughness on one face of a light-transmitting substrate.

The light-transmitting substrate is preferably smooth, heat-resistant, and excellent in the mechanical strength. Specific examples of materials forming the light-transmitting substrate include thermoplastic resins such as polyester (polyethylene terephthalate, polyethylene naphthalate), cellulose triacetate, cellulose diacetate, cellulose acetatebutyrate, polyamide, polyimide, polyether sulfone, polysulfone, polypropylene, polymethyl pentene, polyvinyl chloride, polyvinyl acetal, polyether ketone, polymethyl methacrylate, polycarbonate, and polyurethane. Preferable among these are polyester (polyethylene terephthalate, polyethylene naphthalate) and cellulose triacetate.

The thermoplastic resins are preferably used as the light-transmitting substrate in the form of a film-like body with good flexibility. If the application requires curability, these thermoplastic resins are also usable in the form of a plate or a plate-like body such as a glass plate.

In addition, a film of an amorphous olefin polymer (cyclo-olefin-polymer: COP) having an alicyclic structure may be used as the light-transmitting substrate. Such a film is a substrate made of a norbornene polymer, a monocyclic olefin polymer, a cyclic conjugated diene polymer, a vinyl alicyclic hydrocarbon polymer, or the like. Examples of the film include ZEONEX and ZEONOR (norbornene resin) (Nippon Zeon Co., Ltd.), SUMILITE FS-1700 (Sumitomo Bakelite Co., Ltd.), ARTON (modified norbornene resin) (JSR Corporation), APEL (cyclic olefin copolymer) (Mitsui Chemicals, Inc.), Topas (cyclic olefin copolymer) (Ticona Inc.), and OPTOREZ OZ-1000 series (alicyclic acrylic resin) (Hitachi Chemical Co., Ltd.).

Further, FV series (low birefringence and low photoelastic modulus films) (Asahi Kasei Chemicals Corporation) are also preferred as an alternative substrate of triacetyl cellulose.

The thickness of the light-transmitting substrate in the form of a film-like body is preferably 20 to 300 μm. More preferably, the lower limit is 30 μm and the upper limit is 200 μm. In cases where the light-transmitting substrate is a plate-like body, the thickness thereof may exceed the above range.

Prior to formation of a layer such as the hard coating layer on the light-transmitting substrate, the substrate may be subjected to physical or chemical treatment such as corona discharge treatment and oxidation treatment, or may be subjected to application of an anchor agent or a coating composition called a primer in order to improve adhesiveness.

In cases where triacetyl cellulose, which is commonly mainly used as a light-transmitting substrate for LCDs, is used as a material and thinning of a display is intended, the thickness of the light-transmitting substrate is preferably 20 to 65 μm.

The antiglare layer is formed on one face of the light-transmitting substrate and has surface roughness.

The antiglare layer contains silica fine particles, organic fine particles, and a binder resin, and the surface roughness thereof is shaped by agglomerates of the silica fine particles and the organic fine particles described later.

In the antiglare film of the present invention, the surface roughness formed on the antiglare layer include projections with gentler slope than that formed of single fine particles (e.g., organic fine particles) or agglomerates of single particles (e.g., agglomerates of silica fine particles) on the antiglare layer, and therefore is more moderate. The reason for this is presumably that, as described later, the silica fine particles and organic fine particles are distributed in a specific state in the antiglare layer in the antiglare film of the present invention.

In the antiglare film of the present invention, the silica fine particles include those contained sparsely and densely in the antiglare layer in the form of agglomerates. The agglomerates of the silica fine particles distributed sparsely and densely in the antiglare layer form moderate surface roughness on the antiglare layer.

The phrase "dispersed sparsely and densely in the antiglare layer" means the presence of plural areas where the agglomerates of silica fine particles are distributed densely and plural areas where the agglomerates of silica fine particles are distributed sparsely in the antiglare layer. In other words, the agglomerates of silica fine particles are distributed unevenly in the antiglare layer.

In the present description, the "area where the agglomerates of silica fine particles are distributed densely" is defined as an area where the proportional area of the agglomerates of silica fine particles is at least 5% in a 2 μm-square observation area in a picture of a perpendicular cross section of the antiglare layer observed by an electron microscope (preferably of a transmission type such as TEM or STEM) at 10,000 times magnification. The "area where the agglomerates of silica fine particles are distributed sparsely" is defined as an area where the proportional area of the agglomerates of silica fine particles in a 2 μm-square observation area is less than 1%.

The area where the agglomerates of silica fine particles are distributed densely or the area where the agglomerates of silica fine particles are distributed sparsely, namely, the areas to be observed by an electron microscope at 10,000 times magnification may be determined by observing the distribution state of the silica fine particles in a perpendicular cross section of the antiglare layer by an electron microscope at lower magnification (about 3000 times magnification).

Such distribution states of the agglomerates of silica fine particles are easily distinguished by observation of a perpendicular cross section of the antiglare layer by an electron microscope. For example, in FIG. 2 that shows a cross-sectional STEM picture of an antiglare film according to Example 1, a deep-colored band in the center is a cross section of the antiglare layer, and black dots in the cross section are the agglomerates of silica fine particles. Uneven distribution of the agglomerates of silica fine particles is clearly observed in the picture. The proportional area of the agglomerates of silica fine particles can be calculated using image analysis software.

In the antiglare film of the present invention, the silica fine particles are preferably surface-treated. Surface treatment on the silica fine particles allows control of the degree of non-uniform distribution of the agglomerates of silica particles in the antiglare layer as appropriate and control of the effect provided by dense distribution around organic fine particles within a proper range. In addition, the chemical resistance and saponification resistance of the silica fine particles themselves are enhanced.

The surface treatment is preferably hydrophobization. For example, the silica fine particles may be treated with a hydrophobic agent such as a silane compound having alkyl.

Examples of the alkyl include methyl, ethyl, propyl, butyl, hexyl, and octyl. Examples of the silane compound having alkyl include methyltrichlorosilane, dimethyldichlorosilane, trimethylchlorosilane, trimethylsilanol, hexamethyldisilazane, methyltrimethoxysilane, methyltriethoxysilane, ethyltriethoxysilane, propyltrimethoxysilane, butyltrimethoxysilane, and octyltrimethoxysilane.

The silica fine particles commonly have hydroxy (silanol) on the surface. The surface treatment reduces the number of hydroxy on the surface of the silica fine particles to prevent excessive agglomeration of the silica fine particles, thereby exerting the above effect.

It is also preferable that agglomeration of the silica fine particles is controlled by adjusting the hydrophobization degree of the surface of the silica fine particles through appropriate determination of the kind of the hydrophobic agent. For example, a longer alkyl chain of a silane compound having alkyl increases the steric hindrance caused by the silane compound having alkyl, thereby lowering the hydrophobization degree of the surface of the silica fine particles.

The silica fine particles are preferably formed of amorphous silica. In a case where the silica fine particles are formed of crystalline silica, lattice defects in the crystal structure increase the Lewis acidity of the silica fine particles, failing to suppress excessive agglomeration of the silica fine particles as mentioned above.

Such silica fine particles are preferably fumed silica as it is easily agglomerated to form agglomerates described later. The fumed silica refers to amorphous silica having a particle size of at most 200 nm prepared by a dry method. Such silica is prepared by a reaction of a volatile compound containing silicon in a gas phase. Specific examples thereof include a silicon compound prepared by, for example, hydrolizing $SiCl_4$ in oxygen/hydrogen flame. Specifically, AEROSIL R805 (Nippon Aerosil Co., Ltd.) can be exemplified.

The amount of the silica fine particles is not particularly limited and is preferably 0.1 to 5.0% by mass in the antiglare layer. If the amount is less than 0.1% by mass, dense distribution around the organic fine particles mentioned above may not be sufficiently achieved. If the amount is more than 5.0% by mass, excessive agglomerates are formed to cause internal diffusion and/or formation of large projections and depressions on the antiglare layer, leading to occurrence of white muddiness. More preferably, the lower limit of the amount is 0.5% by mass and the upper limit is 3.0% by mass.

The silica fine particles preferably have an average primary particle size of 1 to 100 nm. If the average primary particle size is less than 1 nm, dense distribution around the organic fine particles mentioned above may not be sufficiently achieved. If the average primary particle size is more than 100 nm, dense distribution around the organic fine particles mentioned above may not be sufficiently achieved. More preferably, the lower limit is 5 nm, and the upper limit is 50 nm.

The average primary particle size of the silica fine particles is determined using image processing software based on a cross-sectional electron microscope (preferably of a transmission type (e.g., TEM, STEM) at 50,000 or more times magnification) picture.

In the antiglare layer of the present invention, the agglomerates of silica fine particles have a moniliform structure (shape like a pearl necklace) in which the silica fine particles are linked to each other.

In a case where the silica fine particles are linked to each other to form moniliform agglomerates, the surface roughness of the antiglare layer may be moderate as described later.

The moniliform structure in which the silica fine particles are linked to each other may be any structure such as a structure in which the silica fine particles are linearly linked (straight-chain structure), a structure in which plural straight-chain structures are intertwined with each other, and a branch structure in which the straight-chain structure has one or two or more side chains formed of plural silica fine particles linked with each other.

The agglomerates of silica fine particles preferably have an average particle size of 100 nm to 1 μm. If the average particle size is less than 100 nm, a later-described buffering action of the agglomerates in formation of the projections and depressions by curing shrinkage may not be sufficiently exerted. If the average particle size is more than 1 μm, dense distribution around the organic fine particles mentioned above may not be sufficiently achieved. In addition, light may be scattered by the agglomerates of silica fine particles, and projections and depressions formed by the agglomerates on the surface may become too large, lowering the contrast in a bright room and a dark room of an image display device including the antiglare film of the present invention. More preferably, the lower limit of the average particle size of the agglomerates is 200 nm, and the upper limit thereof is 800 nm.

The average particle size of the agglomerates of silica fine particles is determined by choosing a 5 μm-square area including many agglomerates of silica fine particles based on observation of a cross-sectional electron microscope picture (at 10,000 to 20,000 times magnification), measuring the particle sizes of the agglomerates of silica fine particles in the area, and averaging top 10 particle sizes of the agglomerates of silica fine particles. In determination of the "particle size of the agglomerate of silica fine particles", the cross section of an agglomerate of silica fine particles is sandwiched with two parallel lines, and the distance between the two lines that are drawn in such a manner that the distance therebetween becomes largest is regarded as the particle size of the agglomerate. The particle size of the agglomerate of silica fine particles may also be calculated using image analysis software.

The antiglare film of the present invention contains organic fine particles in the antiglare layer and have the agglomerates of silica fine particles densely distributed around the organic fine particles.

The agglomerates of silica fine particles are contained in the antiglare layer sparsely and densely as described above, and therefore, the antiglare layer has an area where many agglomerates of silica fine particles are present around the organic fine particles and an area where only the agglomerates of silica fine particles are densely distributed. For example, FIG. 4 is a cross-sectional electron microscope picture of an antiglare layer of an antiglare film according to Example 2. As shown in FIG. 4, a state where the agglomerates of silica fine particles are densely distributed around the organic fine particles is easily observed by electron microscopy of a cross section of the antiglare layer.

In electron microscopy of a cross section of the antiglare layer, the agglomerates of silica fine particles densely distributed around the organic fine particles are observed not only in a central cross section of the organic fine particles, but also in an off-center cross section of the organic fine particles.

The state where "the agglomerates of silica fine particles are densely distributed around the organic fine particles" refers to a state where the proportional area of the agglomerates of silica fine particles is at least 10% in an circular area surrounding the organic fine particle at a distance of 200 nm from the particle (excluding the area corresponding to the organic fine particle) in microscopy of a perpendicular cross section of the antiglare layer where the organic fine particles are observed using an electron microscope (preferably of a transmission type (e.g., TEM, STEM)) at 20,000 times magnification.

In the antiglare film of the present invention, part of the agglomerates of silica fine particles densely distributed around the organic fine particles are attached to the surface of the organic fine particles and/or have some of the silica fine particles contained in the agglomerates impregnate the inside of the organic fine particles (hereinafter, such agglomerates of silica fine particles are also described that the agglomerates are attached or the like to the surface of the organic fine particles). The agglomerates of silica fine particles attached or the like to the surface of the organic fine particles utilizes an agglomeration force among the agglomerates of silica fine particles attached or the like to different organic fine particles, thereby gathering the different organic fine particles. Accordingly, even if the added amount of organic fine particles is small, the surface roughness of the film may have sufficient antiglare properties.

Here, gathering organic fine particles does not mean complete adhesion of the organic fine particles, but means a state where the closest distance between the organic fine particles is smaller than the average particle size thereof in observation of a cross section of the antiglare layer or a state where plural agglomerates of silica fine particles are continuously strung between organic fine particles as in the case of two organic fine particles positioned at the upper center and positioned on the lower right hand in FIG. 4.

FIG. 3 is an enlarged electron microscope picture of FIG. 2 that is a cross-sectional microscope picture of the antiglare layer of the antiglare film according to Example 1. As shown in FIG. 3, the agglomerates of silica fine particles attached or the like to the surface of the organic fine particles are easily observed by electron microscopy of a cross section of the antiglare layer.

The agglomerates of silica fine particles are attached to the surface of the organic fine particles, for example, by adjusting the degree of hydrophilicity/hydrophobicity between the silica fine particles and organic fine particles. The degree of hydrophilicity/hydrophobicity is adjusted by changing the hydrophobic agent for silica fine particles, the degree of treatment, and the materials constituting the organic fine particles, as mentioned above, or by hydrophilizing the surface of the organic fine particles, as described later.

Some of the silica fine particles contained in the agglomerate of silica fine particles are allowed to impregnate the inside of the organic fine particles from the surface, for example, by lowering the degree of cross-linkage of the organic fine particles or adding a solvent capable of swelling the organic fine particles to a composition for an antiglare layer upon forming the antiglare layer.

The organic fine particles preferably have the agglomerates of silica fine particles uniformly attached or the like to the entire surface thereof.

The percentage of the agglomerates of silica fine particles attached or the like to the surface of the organic fine particles in the agglomerates of silica fine particles densely distributed around the organic fine particles is preferably at least 50% in the proportional area of an circular area surrounding the organic fine particle at a distance of 200 nm from the particle (excluding the area corresponding to the organic fine particle) in observation of a perpendicular cross section of the antiglare layer where the organic fine particles are observed using an electron microscope (preferably of a transmission type (e.g., TEM, STEM)) at 20,000 times magnification. If the proportion is less than 50%, the effect of gathering organic fine particles in the antiglare layer may be insufficient, failing to form projections and depressions enough for exerting sufficient antiglare properties.

In a case where some of the silica fine particles constituting the agglomerates of silica fine particles impregnate the inside of the organic fine particles, the agglomerates of the silica fine particles preferably impregnate to a depth up to 500 nm from the surface of the organic fine particles. In order to have the silica fine particles constituting the agglomerates impregnate the organic fine particles to a depth exceeding 500 nm from the surface thereof, the organic fine particles need to be excessively swelled. In such a case, the composition for an antiglare layer may be highly viscous or gelled, failing to provide uniform coating. In addition, moderate surface roughness described later may not be formed on the antiglare layer.

As described above, as the agglomerates formed by moniliformly linked silica fine particles and the organic fine particles are contained in the antiglare layer in such a specific state, the antiglare layer in the antiglare film of the present invention has projections with a gentler slope than that formed of single fine particles or agglomerates thereof, to have moderate surface roughness. As a result, the antiglare film of the present invention can improve the contrast while maintaining the antiglare properties. Since the antiglare layer have projections with a gentler slope on its surface to have moderate surface roughness, only edge portions of an image reflected on the surface of the antiglare layer becomes invisible, and thus the antiglare properties are secured. Moreover, the antiglare layer having such surface roughness can avoid large diffusion to prevent stray light and allow appropriate regular transmission. In such a case, displayed images are bright and have an excellent contrast both in a bright room and in a dark room.

The reason for this is presumably as follows.

If the composition for an antiglare layer has a low viscosity, the binder resin in the composition tends to have a shape following the shape of the organic fine particles upon volatilization of the solvent in drying of the applied composition. Moreover, though the binder resin shrinks upon curing, the organic fine particles do not shrink. Accordingly, only the binder resin shrinks, so that protrusions with a steep slope are likely to be formed on the surface at positions corresponding to the organic fine particles.

Dense distribution of the agglomerates of silica fine particles around the organic fine particles, however, increases the viscosity of the composition for an antiglare layer around the organic fine particles. In such a case, the binder resin is less likely to have a shape following the shape of the organic fine particles upon volatilization of the solvent, and the binder (formed of the binder resin and silica fine particles) at that position is less likely to shrink on curing. Moreover, in the agglomerate in which silica fine particles are moniliformly linked, the particles are sparsely agglomerated together with the binder resin. Such agglomerates have a buffering action against curing shrinkage, and therefore, projections formed on the surface at positions corresponding to the organic fine particles are likely to have a gentle slope.

For the above reasons, the surface roughness (projections) formed of the organic fine particles on the antiglare layer presumably has a gentler angle of inclination than the surface roughness (projections) formed of single fine particles.

Preferably, the organic fine particles have comparatively similar particle sizes and mainly form the surface roughness on the antiglare layer. The agglomerates of silica fine particles are distributed in the antiglare layer sparsely and densely as described above, and preferably have comparatively various particle sizes in the antiglare layer. The antiglare layer containing such two kinds of fine particles with particle sizes having the above relationship allows the antiglare film of the present invention to form a structure in which the agglomerates of silica fine particles having various particle sizes are dispersed among the organic fine particles having similar particle sizes in the antiglare layer. Accordingly, moderate surface roughness as described above is favorably formed on the antiglare layer.

The phrase "fine particles having comparatively similar particle sizes" refers to a case where $(d75-d25)/MV \leq 0.25$ is satisfied in which MV represents the weight-average particle size of fine particles, d25 represents the cumulative 25% particle size and d75 represents the cumulative 75% particle size. The phrase "agglomerates having comparatively various particle sizes" refers to a case where $(d75-d25)/MV > 0.25$ is satisfied. The term "cumulative 25% particle size" refers to a particle size at which the mass of the particles reaches 25% in cumulative counting of the particles in an ascending order of the particle size distribution chart. The same shall apply to the term "cumulative 75% particle size". The weight average particle size, the cumulative 25% particle size, and the cumulative 75% particle size of fine particles are each measured as a weight-average size by the coulter counter method.

In the antiglare layer, the organic fine particles and silica fine particles preferably have a ball shape in a single particle. In a case where the organic fine particles and silica fine particles have a ball shape in a single particle, the antiglare film of the present invention used in an image display device can provide display images with a high contrast.

The term "ball shape" refers to spherical, ellipsoidal, and the like shapes, i.e., shapes excluding amorphous shapes.

The organic fine particles are fine particles mainly forming the surface roughness of the antiglare layer and the refractive index or particle size thereof are easily controlled. The presence of such organic fine particles in the antiglare layer facilitates control of the size of the surface roughness formed on the antiglare layer. Since the difference in the refractive index between the organic fine particles and the binder resin is easily controlled, the antiglare film of the present invention can control the antiglare properties and suppress scintillation and white muddiness.

The organic fine particles are preferably fine particles formed of at least one material selected from the group consisting of acrylic resins, polystyrene resins, styrene-acrylic copolymers, polyethylene resins, epoxy resins, silicone resins, polyvinylidene fluoride resins, and polyethylene fluoride resins. Among these, preferred are styrene-acrylic copolymer fine particles. Styrene has a high refractive index and is highly hydrophobic. Acryl has a low refractive index and is highly hydrophilic. Accordingly, a change in the ratio of styrene and acryl easily changes the refractive index and the degree of hydrophilicity/hydrophobicity of the styrene-acrylic copolymer fine particles.

The organic fine particles are preferably surface-hydrophilized. The surface-hydrophilized organic fine particles have higher affinity with the silica fine particles, thereby facilitating the attachment of the agglomerates of silica fine particles to the surface of the organic fine particles. Moreover, also facilitated is dense distribution of the agglomerates of silica fine particles around the organic fine particles.

The method of surface hydrophilization is not limited and may be a known method. Examples thereof include a method of copolymerizing a monomer having a functional group such as carboxy and hydroxy with the surface of the organic fine particles.

Commonly, surface-hydrophilized organic fine particles cannot moderately gather in the antiglare layer, and therefore, the surface roughness may not be sufficiently formed on the antiglare layer, resulting in poor antiglare properties. In the present invention, however, the silica fine particles form agglomerates to be sparsely and densely contained in the antiglare layer and the agglomerates are densely distributed around the organic fine particles, so that desired surface roughness is formed even on the antiglare layer containing surface-hydrophilized organic fine particles.

The amount of the organic fine particles is preferably 0.5 to 10.0% by mass in the antiglare layer. If the amount is less than 0.5% by mass, the antiglare properties may be insufficient. If the amount is more than 10.0% by mass, white muddiness may occur and the contrast of display images may be poor in the case of using the antiglare film of the present invention in an image display device. More preferably, the lower limit is 1.0% by mass and the upper limit is 8.0% by mass.

The size of the organic fine particles is appropriately determined in accordance with the thickness of the antiglare layer or the like. The average particle size is preferably 0.3 to 5.0 μm. If the average particle size is less than 0.3 μm, the dispersibility of the organic fine particles may not be controlled. If the average particle size is more than 5.0 μm, the surface roughness on the antiglare layer may be too large, possibly causing scintillation. More preferably, the lower limit is 1.0 μm and the upper limit is 3.0 μm.

The average particle size of the organic fine particles is preferably 20 to 60% relative to the thickness of the antiglare layer. If the average particle size is more than 60%, the organic fine particles may protrude above the outermost surface of the coating and protrusions formed by the organic fine particles may be steep. If the average particle size is less than 20%, sufficient surface roughness may not be formed on the antiglare layer, resulting in poor antiglare properties.

The average particle size of the organic fine particles may be measured as a weight-average size by the coulter counter method when the organic fine particles are solely measured. The average particle size of the organic fine particles in the antiglare layer may be determined as the average of maximum sizes of 10 particles in transmission optical microscopy of the antiglare layer. If such a method is inappropriate, the average particle size of the organic fine particles is determined as follows. In electron microscopy (preferably of a transmission type such as TEM, STEM) of cross sections taken near the center of the particles, selected are any 30 particles which seem to be of the same kind with similar particle sizes (the n number is increased as it is not known which part of the particle is sectioned to give a cross section). The maximum particle sizes of the 30 particles are measured, and the average thereof is determined as the average particle size of the organic fine particles. Since all of these determinations are based on images, image analysis software may be used for calculation.

The antiglare layer preferably has a thickness of 2.0 to 7.0 μm. If the thickness is less than 2.0 μm, the surface of the antiglare layer may be easily scarred. If the thickness is more than 7.0 μm, the antiglare layer may be fragile. More preferably, the thickness of the antiglare layer is within a range of 2.0 to 5.0 μm. The thickness of the antiglare layer can be measured by cross-sectional microscopy.

The antiglare layer contains the silica fine particles and organic fine particles dispersed in a binder resin. The binder resin is preferably transparent and is preferably, for example, an ionizing radiation-curable resin, which is a resin cured by irradiation with UV light or electron beam, cured by irradiation with UV light or electron beam.

The concept of the word "resin" as used herein includes monomer, oligomer, polymer, and the like, unless otherwise specified.

The ionizing radiation-curable resin may be a compound having one or two or more unsaturated bonds. Examples thereof include compounds having a functional group such as acrylate functional groups. Examples of the compounds having one unsaturated bond include ethyl(meth)acrylate, ethylhexyl(meth)acrylate, styrene, methylstyrene, and N-vinylpyrrolidone. Examples of the compounds having two or more unsaturated bonds include polyfunctional compounds such as trimethyrolpropane tri(meth)acrylate, tripropylene glycol di(meth)acrylate, diethyleneglycol di(meth)acrylate, pentaerythritol tri(meth)acrylate, dipentaerythritol hexa(meth)acrylate, 1,6-hexanediol di(meth)acrylate, neopentylglycol di(meth)acrylate, trimethyrolpropane tri(meth)acrylate, ditrimethylolpropane tetra(meth)acrylate, pentaerythritol tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamanthyl di(meth)acrylate, isobornyl(meth)acrylate, dicyclopentane di(meth)acrylate, and tricyclodecane di(meth)acrylate. The word "(meth)acrylate" as used herein refers to methacrylate and acrylate. In the present invention, the ionizing radiation-curable resin may also be any of the above compounds modified with PO, EO, or the like.

In addition to the above compounds, also usable as the ionizing radiation-curable resin are polyester resin, polyether resin, acrylic resin, epoxy resin, urethane resin, alkyd resin, spiroacetal resin, polybutadiene resin, and polythiol polyene resin, all of which have a comparatively low molecular weight and include an unsaturated double bond.

The ionizing radiation-curable resin may be used in combination with a solvent-drying resin (resin that forms a coating only by drying a solvent added for adjustment of the solid content for application of the resin (e.g., thermoplastic resin)). The use in combination with a solvent-drying resin effectively prevents the resulting coating liquid from forming defective coating on the surface in formation of the antiglare layer.

The solvent-drying resin usable in combination with the ionizing radiation-curable resin is not particularly limited, and a thermoplastic resin may be commonly used.

The thermoplastic resin is not particularly limited, and examples thereof include styrene resin, (meth)acrylic resin, vinyl acetate resin, vinyl ether resin, halogen-containing resin, alicyclic olefin resin, polycarbonate resin, polyester resin, polyamide resin, cellulose derivatives, silicone resin, rubber, and elastomer. The thermoplastic resin is preferably amorphous and soluble in an organic solvent (especially, a common solvent that can dissolve plural polymers and curable compounds). In particular, from the standpoint of film forming properties, transparency, and weather resistance, preferred are styrene resin, (meth)acrylic resin, alicyclic olefin resin, polyester resin, cellulose derivative (e.g., cellulose esters) and the like.

The antiglare layer may contain a thermosetting resin.

The thermosetting resin is not particularly limited, and examples thereof include phenolic resin, urea resin, diallyl phthalate resin, melamine resin, guanamine resin, unsaturated polyester resin, polyurethane resin, epoxy resin, aminoalkyd resin, melamine-urea co-condensed resin, silicon resin, and polysiloxane resin.

The binder resin preferably mainly contains a polyfunctional acrylate monomer not containing hydroxy in a molecule. The phrase "mainly contains a polyfunctional acrylate monomer not containing hydroxy in a molecule" refers to a case where the amount of a polyfunctional acrylate monomer not containing hydroxy in a molecule is the largest in raw material monomers of the binder resin. Since the polyfunctional acrylate monomer not containing hydroxy in a molecule is a hydrophobic monomer, the binder resin contained in the antiglare layer of the antiglare film of the present invention is preferably a hydrophobic resin. In a case where the binder resin mainly includes a hydrophilic resin having hydroxy, a highly polar solvent (e.g., isopropyl alcohol) described later is less likely to be evaporated, so that the silica fine particles are less likely to be attached to and/or impregnate the organic fine particles. In such a case, silica fine particles independently agglomerate, possibly forming projections that adversely affect scintillation on the surface of the antiglare layer. Here, the degree of attachment and/or impregnating of the silica fine particles to the organic fine particles can be adjusted by changing the ratio of the polyfunctional acrylate monomer not containing hydroxy in a molecule and a polyfunctional acrylate monomer containing hydroxy.

Examples of the polyfunctional acrylate monomer not containing hydroxy in a molecule include pentaerythritol tetraacrylate (PETTA), 1,6-hexanediol diacrylate (HDDA), dipropyleneglycol diacrylate (DPGDA), tripropyleneglycol diacrylate (TPGDA), PO-modified neopentylglycol diacrylate, tricyclodecane dimethanol diacrylate, trimethylolpropane triacrylate (TMPTA), trimethylolpropane ethoxy triacrylate, dipentaerythritol hexaacrylate (DPHA), pentaerythritol ethoxy tetraacrylate, and ditrimethylolpropane tetraacrylate. Among these, preferred is pentaerythritol tetraacrylate (PETTA).

The antiglare layer containing the silica fine particles, the organic fine particles, and the binder resin can be formed by applying a composition for an antiglare layer containing monomer components of the silica fine particles, the organic fine particles, and the binder resin mentioned above and a solvent onto a light-transmitting substrate, drying the composition to form a coating, and then curing the coating by ionizing radiation or the like.

Preferably, the silica fine particles in the composition for an antiglare layer are uniformly dispersed in the form of agglomerates described above in the composition, and sparsely and densely distributed when the coating is dried and densely distributed around the organic fine particles. If the agglomerates of silica fine particles are not uniformly dispersed in the composition for an antiglare layer, agglomeration excessively progresses in the composition for an antiglare layer to form huge agglomerates of the silica fine particles. In such a case, an antiglare layer having moderate surface roughness cannot be formed.

Since the silica fine particles can thicken the composition for an antiglare layer, the silica fine particles contained in the composition for an antiglare layer can suppress precipitation of organic fine particles therein. In other words, the silica fine particles presumably promotes achievement of a predetermined distribution of the organic fine particles and the agglomerates of silica fine particles, and also improves the pot life of the composition for an antiglare layer.

A solvent added to the composition for an antiglare layer is, for example, a highly polar and highly volatile solvent in a predetermined amount. In such a case, the silica fine particles in the composition for an antiglare layer are uniformly dispersed in the composition in the form of agglomerates described above, and sparsely and densely distributed when the coating is dried and densely distributed around the organic fine particles. Such a highly polar and highly volatile solvent in the composition for an antiglare layer prevents excessive agglomeration of the agglomerates of silica fine particles. In addition, upon formation of a coating by applying and drying the composition on the light-transmitting substrate, the highly polar and highly volatile solvent volatilizes faster than other solvents. Accordingly, the formulation of the composition is changed upon formation of the coating, so that the agglomerates of silica fine particles gather around the organic fine particles and the agglomerates of silica fine particles themselves gather to achieve the state where the agglomerates of silica fine particles are sparsely and densely distributed in the coating and densely distributed around the organic fine particles.

Here, a "highly polar solvent" refers to a solvent having a solubility parameter of at least 10 $[(cal/cm^3)^{1/2}]$, and a "highly volatile solvent" refers to a solvent having a relative evaporation rate of at least 150. Accordingly, the "highly polar and highly volatile solvent" refers to a solvent satisfying the both requirements of the "highly polar solvent" and the "highly volatile solvent".

The solubility parameter is calculated by the method of Fedors. The method of Fedors is disclosed, for example, in "Fundamentals and Applications of SP Values and Calculation Methods" (Hideki Yamamoto, JOHOKIKO CO., LTD., 2005). In the method of Fedors, the solubility parameter is calculated using the following equation:

Solubility parameter=$[\Sigma E_{coh}/\Sigma V]^2$.

In the equation, $E_{coh}$ represents an agglomeration energy density and V represents a molar volume. The solubility parameter is calculated by determining $\Sigma E_{coh}$ and $\Sigma V$ that are the total of $E_{coh}$ and V, respectively, based on $E_{coh}$ and V determined for each atom group.

The relative evaporation rate is herein determined based on the assumption that the evaporation of n-butyl acetate is 100, and is calculated using the following equation based on the evaporation rate measured in conformity with ASTM D3539-87. Specifically, the evaporation time of n-butyl acetate and the evaporation time of each solvent are measured at 25° C. in dry air, and the relative evaporation rate is calculated.

Relative evaporation rate=(Time required for evaporation of 90% by weight of n-butyl acetate)/(Time required for evaporation of 90% by weight of target solvent)×100

Examples of the highly polar and highly volatile solvent include ethanol and isopropyl alcohol. Among these, preferred is isopropyl alcohol.

The amount of isopropyl alcohol in the solvent is preferably at least 20% by mass in the entire solvent. If the amount is less than 20% by mass, agglomerates of silica fine particles may be formed in the composition for an antiglare layer. The amount of the isopropyl alcohol is preferably at most 40% by mass. The degree of agglomeration can be controlled by using a mixed solvent containing at least two solvents having different polarity and volatilization rate, in a different ratio.

Examples of other solvents contained in the composition for an antiglare layer include ketones (e.g., acetone, methyl ethyl ketone, methyl isobutyl ketone, cyclohexanone), ethers (e.g., dioxane, tetrahydrofuran), aliphatic hydrocarbons (e.g., hexane), alicyclic hydrocarbons (e.g., cyclohexane), aromatic hydrocarbons (e.g., toluene, xylene), halocarbons (e.g., dichloromethane, dichloroethane), esters (e.g., methyl acetate, ethyl acetate, butyl acetate), alcohols (e.g., butanol, cyclohexanol), cellosolves (e.g., methyl cellosolve, ethyl cellosolve), cellosolve acetates, sulfoxides (e.g., dimethyl sulfoxide), amides (e.g., dimethylformamide, dimethylacetamide), and mixtures of these.

The composition for an antiglare layer preferably further contains a photopolymerization initiator.

The photopolymerization initiator is not particularly limited, and a known initiator may be used. Specific examples thereof include acetophenones, benzophenones, Michler-Benzoyl benzoate, α-amyl oxime ester, thioxanthones, propiophenones, benzyls, benzoins, and acylphosphine oxides. A photosensitizer is preferably used together, and specific examples thereof include n-butylamine, triethylamine, and poly-n-butylphosphine.

Preferably, in the case where the binder resin is a resin having a radical polymerizable unsaturated group, the photopolymerization initiator is acetophenones, benzophenoned, thioxanthoned, benzoins, benzoin methyl ether or the like used solely or in combination. In the case where the binder resin is a resin having a cationic polymerizable functional group, the photopolymerization initiator is preferably aromatic diazonium salt, aromatic sulfonium salt, aromatic iodonium salt, metallocene compound, benzoin sulfonic acid ester or the like used solely or in combination.

The amount of the photopolymerization initiator in the composition for an antiglare layer is preferably 0.5 to 10.0 parts by mass for 100 parts by mass of the binder resin. If the amount is less than 0.5 parts by mass, hard coating properties of the resulting antiglare layer may be insufficient. If the amount is more than 10.0 parts by mass, curing may be unfavorably disturbed.

The amount (solid content) of raw materials in the composition for an antiglare layer is not particularly limited, and is commonly 5 to 70% by mass, and preferably 25 to 60% by mass.

The composition for an antiglare layer may contain conventionally known additives such as dispersants, surfactants, antistatic agents, silane coupling agents, thickeners, anti-coloring agents, colorants (pigment, dye), defoamers, leveling agents, flame retardants, UV absorbers, tackifiers, polymerization inhibitors, antioxidants, surface modifiers, and lubricants, in accordance with the purposes such as increasing the hardness of the antiglare layer, suppressing curing shrinkage, and controlling the refractive index.

Examples of the leveling agents include silicone oil and fluorochemical surfactants. Preferred is a fluorochemical surfactant containing perfluoroalkyl or polyether-modified silicone, as the antiglare layer is prevented from having a Bernard cell structure. In the case of applying a resin composition containing a solvent and drying the composition to form a coating, a large number of convective flows are caused in the coating due to a difference in the surface tension between the coating surface and the inner face of the coating. The structure caused by the convective flows is called a Bernard cell structure that causes problems of the resulting antiglare layer such as orange peel or defective coating.

The Bernard cell structure increases the size of projections and depressions on the surface of the antiglare layer to adversely affect the problems of white muddiness and scintillation. Use of the leveling agent as mentioned above prevents such convective flows, allowing not only formation of a film with surface roughness without defects or unevenness but also easy adjustment of the surface roughness.

The composition for an antiglare layer may further contain a photosensitizer, and specific examples of the photosensitizer include n-butylamine, triethylamine, and poly-n-butylphosphine.

The method of preparing the composition for an antiglare layer is not particularly limited as long as respective components are homogenously mixed. For example, the composition may be prepared by using a known device such as a paint shaker, bead mill, kneader, mixer or the like.

The method of applying the composition for an antiglare layer onto a light-transmitting substrate is not particularly limited, and examples thereof include known methods such as spin coating, dipping, spraying, die-coating, bar-coating, roll coating, meniscus coating, flexo printing, screen printing, and bead coating.

After application of the composition for an antiglare layer by any of the above methods, the formed coating is delivered to a heated zone for drying and dried by a known method, thereby evaporating the solvent. Here, the distribution state of the organic fine particles and the agglomerates of silica fine particles can be adjusted by appropriately determining the relative evaporation rate of the solvent, solid content concentration, coating liquid temperature, drying temperature, speed of drying wind, drying time, solvent atmosphere concentration of the drying zone, and the like.

Especially, the distribution state of the organic fine particles and the agglomerates of silica fine particles is easily adjusted by appropriately determining the drying conditions. Specifically, the drying temperature is preferably 30 to 120° C., and the speed of drying wind is preferably 0.2 to 50 m/s. The drying treatment appropriately adjusted within these ranges is conducted once or for plural times, so that the distribution state of the organic fine particles and the agglomerates of silica fine particles are adjusted as desired.

The ionizing radiation for curing the dried coating is, for example, carried out using a light source such as ultra-high pressure mercury lamps, high-pressure mercury lamps, low-pressure mercury lamps, carbon-arc lamps, black light fluorescent lamps, and metal halide lamps.

The UV light may have a wavelength in a range of 190 to 380 nm. Specific examples of the electron beam source include various electron beam accelerators such as Cockcroft Walton type, Van de graff type, resonance transformer type, insulated core transformer type, linear type, Dainamitoron type, and high-frequency type.

The antiglare film of the present invention includes an antiglare layer with surface roughness formed of silica fine particles and organic fine particles as described above, so that the surface roughness is moderate. In terms of the surface roughness of the antiglare layer, assuming that the projections and depressions on the antiglare layer has an average spacing represented by Sm, an average angle of inclination represented by $\theta a$, an arithmetic mean roughness represented by Ra, and a ten point mean roughness represented by Rz, all preferably satisfy the following inequalities. This is from the standpoint of securing the antiglare properties by making only edge portions of an image reflected on the antiglare layer invisible, and avoiding large diffusion to prevent stray light and allow appropriate regular transmission for achieving bright display images with an excellent contrast both in a bright room and in a dark room. If any of $\theta a$, Ra, and Rz is less than the lower limit, reflection of external light may not be prevented. If any of $\theta a$, Ra, and Rz is more than the upper limit, the regular transmission may decrease to reduce the brightness of images, diffuse reflection of external light may increase to lower the contrast in a bright room, and stray light from transmitted video light may increase to lower the contrast in a dark room. In the structure of the present invention, agglomeration may be hardly controlled if Sm is less than the lower limit. If Sm is more than the upper limit, delicate details of images cannot be reproduced, problematically resulting in coarse images.

50 μm<Sm<600 μm
0.1°<$\theta a$<1.5°
0.02 μm<Ra<0.25 μm
0.30 μm<Rz<2.00 μm

The surface roughness of the antiglare layer more preferably satisfies the following inequalities from the above standpoinds:

100 μm<Sm<400 μm;
0.1°<$\theta a$<1.2°;
0.02 μm<Ra<0.15 μm;
0.30 μm<Rz<1.20 μm.

The surface roughness of the antiglare layer still more preferably satisfies the following inequalities:

120 μm<Sm<300 μm;
0.1°<$\theta a$<0.5°;
0.02 μm<Ra<0.12 μm;
0.30 μm<Rz<0.80 μm.

Here, Sm, Ra, and Rz are values determined by the method in conformity with JIS B 0601-1994, and $\theta a$ is a value determined in accordance with the definition in the operation manual (revised on 20 Jul. 1995) of the surface roughness measuring instrument SE-3400 (Kosaka Laboratory Ltd.). As shown in FIG. 1, $\theta a$ is determined based on the arctangent $\theta a = \tan^{-1}\{(h_1+h_2+h_3+\ldots+h_n)/L\}$ of the sum $(h_1+h_2+h_3+\ldots+h_n)$ of heights of the projections present in the standard length L. In the case where the antiglare film has a low refractive index layer as described later on the antiglare layer, the surface roughness formed on the low refractive index layer preferably satisfies the ranges of Sm, $\theta a$, Ra, and Rz.

These values of Sm, $\theta a$, Ra, and Rz are determined by measurement under the following conditions using the surface roughness measuring instrument SE-3400 (Kosaka Laboratory Ltd.).

Standard length (cutoff value λc of the roughness curve): 2.5 mm

Evaluation length (standard length (cutoff value λc)×5): 12.5 mm

Probe sending speed: 0.5 mm/s

The antiglare film of the present invention preferably has a total light transmittance of at least 85%. If the total light transmittance is less than 85%, the antiglare film of the present invention mounted on the surface of an image display device may lower the color reproducibility or visibility. The total light transmittance is more preferably at least 90%, and still more preferably at least 91%.

The total light transmittance is measured using "HM-150" (MURAKAMI COLOR RESEARCH LABORATORY) in conformity with JIS K7361.

The antiglare film of the present invention preferably has a haze of less than 15%. The antiglare layer may have an internal haze due to internal diffusion caused by contained fine particles and an external haze due to the surface roughness on the outermost surface. The internal faze due to internal diffusion is within a range of preferably 0% or more but less than 10%, more preferably 0% or more but less than 7%, and still more preferably 0% or more but less than 5%. The external haze on the outermost surface is within a range of preferably 0% or more but less than 5%, more preferably 0% or more but less than 3%, and still more preferably 0% or more but less than 1%. In a case where the diffused light has a strength at a diffusion angle of not less than 1.0 degree but less than 2.5 degrees in reflection and/or transmission, the internal haze and/or external haze is most preferably 0%. The reason for this is that the antiglare layer does not have an antiglare effect if it does not have diffusion due to the surface roughness with a diffusion angle of at least 1.0 degree, and have stronger scintillation when the diffusion due to the internal diffusion does not have an angle of at least 1.0 degree. Here, the "case where the antiglare film has a strength at a diffusion angle of not less than 1.0 degree but less than 2.5 degrees" refers to a case where the sum of the strength of diffusion light having a diffusion angle of 1.0 to 2.4 degrees is at least 10% relative to the sum of the strength of diffusion light measured for every 0.1-degree change of angle from 0 to 2.4 degrees of diffusion angles.

In the antiglare film of the present invention, fumed silica used as the silica fine particles allows individual control of the internal haze and the external haze of the antiglare layer. Since fumed silica has a small average particle size, the use thereof does not allow expression of the internal haze so that only the external haze is controlled. The internal haze is controlled by controlling the difference in the refractive index between the organic fine particles and the binder resin or by changing the refractive index of the interface of the organic particles through impregnation of the organic particles with monomers of the binder resin. When organic fine particles are impregnated with monomers of the binder resin, the refractive index at the interface of the organic fine particles is inclined. In such a case, a component having a large diffusion angle in the internal diffusion due to the organic fine particles is not generated, suppressing stray light, which is more preferable. The haze can be measured using "HM-150" (MURAKAMI COLOR RESEARCH LABORATORY) in conformity with JIS K7136.

The internal haze is determined as follows.

Onto the projections and depressions on the surface of the antiglare layer of the antiglare film, a resin that has the same or similar (difference of at most 0.02) refractive index as the resin forming the projections and depressions on the surface is applied using a wire bar to a thickness that results in a dried film thickness of 8 μm (i.e., thickness that completely covers the surface roughness to make the film surface flat). The resin is dried at 70° C. for a minute and cured by irradiation with UV light of 100 mJ/cm². Thus obtained film does not have projections and depressions on the surface and is flat. In a case where the composition forming the antiglare layer with the surface roughness contains a leveling agent or the like, the antiglare layer is likely to repel the applied resin and hardly gets wet. In such a case, the surface of the antiglare layer may be hydrophilized by saponification (immersion in a 2 mol/L NaOH (or KOH) solution at 55° C. for three minutes, rinsing, complete removal of water drops using Kimwipes (registered trademark), and drying in a 50° C. oven for a minute).

The flat film does not have surface roughness so as to have only an internal haze. The haze of this film is similarly measured in conformity with JIS K-7136, so that the internal haze is obtained.

The external haze is determined by calculating the formula: (Haze)−(Internal haze).

The antiglare film of the present invention preferably has a low refractive index layer on the antiglare layer as it more favorably prevents white muddiness.

The low refractive index layer lowers the reflectance of the light from outside (e.g., fluorescent lamp, natural light) upon reflection thereof on the surface of the optical layered body. The low refractive index layer is preferably formed of any of the following materials including 1) a resin containing low refractive index particles of silica, magnesium fluoride or the like, 2) a low refractive index fluororesin, 3) a fluororesin containing silica or magnesium fluoride, and 4) a thin film of a low refractive index substance such as silica and magnesium fluoride. The resins other than the fluororesin may be similar resins as the binder resin contained in the antiglare layer.

The above silica is preferably in the form of hollow silica fine particles. Such hollow silica fine particles can be prepared by the method disclosed in the example of JP-2005-099778.

Such a low refractive index layer preferably has a refractive index of not more than 1.45, particularly not more than 1.42.

The thickness of the low refractive index layer is not limited, and may be appropriately set within a common range of about 30 nm to 1 μm.

Though a single low refractive index layer is effective, two or more low refractive index layers may be provided for the purpose of obtaining a lower minimum reflectance or a higher minimum reflectance. In the case of providing two or more low refractive index layers, the respective layers are preferably different in the refractive index and thickness.

The fluororesin may be a polymerizable compound containing a fluorine atom in a molecule or a polymer thereof. The polymerizable compound is not particularly limited, and is preferably a compound having a curable reactive group such as an ionizing radiation-curable group and a thermosetting polar group. Also, it may be a compound having these reactive groups in combination. In contrast to such a polymerizable compound, the polymer does not have such reactive groups at all.

A fluorine-containing monomer having an ethylenic unsaturated bond may be widely used as the polymerizable compound having an ionizing radiation-curable group. Specific examples thereof include fluoroolefins (e.g., fluoroethylene, vinylidene fluoride, tetrafluoroethylene, hexafluoropropylene, perfluoro butadiene, perfluoro-2,2-dimethyl-1,3-dioxole). Examples of those having (meth)acryloyloxy include: a (meth)acrylate compound having a fluorine atom in a molecule such as 2,2,2-trifluoroethyl(meth)acrylate, 2,2,3,3,3-pentafluoropropyl(meth)acrylate, 2-(perfluorobutyl)ethyl (meth)acrylate, 2-(perfluorohexyl)ethyl(meth)acrylate, 2-(perfluorooctyl)ethyl(meth)acrylate, 2-(perfluorodecyl)ethyl(meth)acrylate, α-trifluoromethyl methacrylate, α-trifluoroethyl methacrylate; and a fluorine-containing polyfunctional (meth)acrylate ester compound having at least two (meth)acryloyloxy groups and a C1-C14 fluoroalkyl, fluoro cycloalkyl, or fluoro alkylene group containing at least three fluorine atoms, in a molecule.

Preferable examples of the thermosetting polar group include a hydrogen bond-forming group such as hydroxy, carboxy, amino, and epoxy. These groups are excellent not only in adhesion to the coating but also in affinity with inorganic ultrafine particles Such as silica. Examples of the polymerizable compound having a thermosetting polar group include: 4-fluoroethylene-perfluoro alkyl vinyl ether copolymer; fluoroethylene-hydrocarbon vinyl ether copolymer; fluorine-modified products of various resins such as epoxy, polyurethane, cellulose, phenol, and polyimide.

Examples of the polymerizable compound having both an ionizing radiation-curable group and a thermosetting polar group include partially or fully fluorinated alkyls, alkenyls, or aryl esters of acrylic acid or methacrylic acid, fully or partially fluorinated vinyl ethers, fully or partially fluorinated vinyl esters, and fully or partially fluorinated vinyl ketones.

Examples of the fluororesin include the following substances.

Specifically, the examples include: a polymer of a monomer or monomer mixture containing at least one of the polymerizable fluorine-containing (meth)acrylate compounds having an ionizing radiation-curable group; a copolymer of at least one of the above fluorine-containing (meth)acrylate compounds and a (meth)acrylate compound having no fluorine atom in a molecule such as methyl(meth)acrylate, ethyl (meth)acrylate, propyl(meth)acrylate, butyl(meth)acrylate, and 2-ethyl hexyl(meth)acrylate; a homopolymer or copolymer of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene. Also usable is a silicone-containing vinylidene fluoride copolymer prepared by including a silicone component in one of the above-mentioned copolymers. Examples of the silicone component in this case include (poly)dimethyl siloxane, (poly)diethyl siloxane, (poly)diphenyl siloxane, (poly)methyl phenyl siloxane, alkyl-modified (poly)dimethyl siloxane, azo group-containing (poly)dimethyl siloxane, dimethyl silicone, phenyl methyl silicone, alkyl/aralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, and polyether-modified silicone. In particular, preferred are those having a dimethyl siloxane structure.

Moreover, nonpolymers or polymers of the following compounds are also usable as a fluororesin. The usable compounds are: compounds obtainable by a reaction between a fluorine-containing compound having at least one isocyanate in a molecule and a compound having at least one functional group reactive with isocyanate, such as amino, hydroxy, and carboxy, in a molecule; and compounds obtainable by a reaction between fluorine-containing polyol, such as fluorine-containing polyether polyol, fluorine-containing alkyl polyol, fluorine-containing polyester polyol, and fluorine-containing ϵ-caprolactone-modified polyol, and a compound having isocyanate.

Together with the polymerizable compound having a fluorine atom, any of the binder resins mentioned in the description of the antiglare layer may be used. In addition, curing agents for curing reactive groups and the like and various additives and solvents for improving application properties or providing antifouling properties may be used as appropriate.

In formation of the low refractive index layer, the composition for a low refractive index layer containing a refractive index agent, resin, and the like has a viscosity of preferably 0.5 to 5 mPa·s (25° C.), and more preferably 0.7 to 3 mPa·s (25° C.) in terms of favorable application properties. This enables formation of an antireflection layer excellent in antireflection of visible light, formation of a uniform thin film without application nonuniformity, and formation of a low refractive index layer especially excellent in adhesiveness.

Means for curing the resin may be those mentioned in the description of the antiglare layer. In the case of using a heating means for the hardening process, the fluororesin composition preferably contains a heat polymerization initiator that generates radicals by heat to initiate polymerization of a polymerizable compound.

The low refractive index layer preferably has a thickness $(nm)d_A$ satisfying Equation (1):

$$d_A = m\lambda/(4n_A) \tag{1}$$

(In the equation, $n_A$ represents a refractive index of the low refractive index layer, m represents a positive odd number, preferably 1, and λ represents a wavelength, preferably a wavelength within a range of 480 to 580 nm).

In the present invention, the refractive index layer preferably satisfies Inequality (2):

$$120 < n_A d_A < 145 \tag{2}$$

in terms of lowering the reflectance.

The antiglare film of the present invention may optionally have one or two or more other layers (e.g., antistatic layer, antifouling layer, adhesive layer, another hard coat layer) as long as it does not impair the effect of the present invention. In particular, at least one of an antistatic layer and an antifouling layer is preferably formed. These layers may be similar to those formed in a known antireflection layered body.

The antiglare film of the present invention preferably has a contrast ratio of at least 80% and more preferably at least 90%. If the contrast ratio is less than 80%, the antiglare film of the present invention mounted on the surface of a display device may provide a poor contrast in a dark room to lower the visibility. The contrast ratio as used herein is measured by the following method. A cold-cathode tube light source equipped with a diffuser, as a back light unit, and two polarizers (AMN-3244TP, SAMSUNG) are used. The luminance $L_{max}$ of light passed through the polarlizers arranged in parallel Nicol is divided by the luminance $L_{min}$ of light passed through the polarizers arranged in crossed Nicols to determine a contrast ($L_{max}/L_{min}$). The contrast ($L_1$) of the antiglare film (light-transmitting substrate+antiglare layer and the like) is divided by the contrast ($L_2$) of the light-transmitting substrate to determine a contrast ratio ($L_1/L_2$)×100(%).

The luminance is measured in a dark room. The luminance is measured with a luminance coloriometer (BM-5A, product of TOPCON CORP.). The measurement angle of the luminance coloriometer is set to 1° and the visual field on a sample is set to ϕ5 mm. With respect to the quantity of light from the backlight unit, the backlight unit is set to provide a luminance of 3600 cd/m² when two polarizers are arranged in parallel Nicol without setting a sample.

The antiglare film of the present invention may be produced by forming an antiglare layer on the light-transmitting substrate using a composition for an antiglare layer containing, for example, silica fine particles, organic fine particles, monomer components of a binder resin, and a solvent.

In the formation of the antiglare layer and the composition for an antiglare layer, methods and materials similar to those for the antiglare layer of the antiglare film may be used.

It is to be noted that the methods of forming the antiglare layer and the composition for an antiglare layer and a method of producing an antiglare film of the present invention are not limited to the above methods.

The antiglare film of the present invention may be formed into a polarizer by providing the antiglare film of the present invention on the surface of a polarizing element so that the element is in contact with the surface opposite to the surface where the antiglare layer is formed. Such a polarizer is another aspect of the present invention.

Examples of the polarizing element to be used include, but are not particularly limited to, a polyvinyl alcohol film, a polyvinyl formal film, a polyvinyl acetal film, and a saponified ethylene/vinyl acetate copolymer film, which are prepared by dyeing films with iodine or the like and stretching the dyed films. In the lamination of the polarizing element and the antiglare film of the present invention, the light-transmitting substrate (triacetyl cellulose film) is preferably saponified. Saponification can improve the adhesiveness, thereby providing an antistatic effect.

Another aspect of the present invention is an image display device including the antiglare film or the polarizer.

The image display device may be an LCD, a PDP, an FED, an ELD (organic EL, inorganic EL), a CRT, a tablet PC, a touch panel, an electronic paper display, or the like.

An LCD, which is a typical example of the image display device, includes a transmission display and a light source illuminating the transmission display from the backside. In a case where the image display device of the present invention is an LCD, the antiglare film of the present invention or the polarizer of the present invention is formed on the surface of the transmission display.

In a case where the image display device of the present invention is a liquid crystal display device including the antiglare film of the present invention, the light from the light source illuminates the optical layered body from the downside. A retardation plate may be disposed between a liquid crystal display element and a polarizer. Such a liquid crystal display device may optionally have an adhesive layer between the respective layers.

A PDP, which is one of the above image display devices, includes a front side glass substrate (an electrode is formed on the surface) and a backside glass substrate (an electrode and a fine groove are formed on the surface and red, green, and blue phosphor layers are formed in the groove) disposed to face the front side glass substrate, and discharge gas is enclosed between the substrates. In a case where the image display device of the present invention is a PDP, the antiglare film described above is disposed on the surface of the front side glass substrate or a front plate (glass substrate or film substrate) thereof.

The image display device may be an ELD device in which a light emitter (for example, zinc sulfide, diamine materials) that emits light when a voltage is applied is deposited on a glass substrate and an image is displayed by controlling the voltage applied to the substrate; or a CRT in which electric signals are converted into light to generate an image visible to the human eye. In these cases, the antiglare film described above is provided on the outermost surface of the display device or on the surface of a front plate thereof.

Any image display device of the present invention may be used for displays such as TVs, PCs, electronic paper displays, touch panels, and tablet PCs. Particularly, the image display device of the present invention can be suitably used for the surfaces of displays for high-resolution images, such as CRTs, liquid crystal panels, PDPs, ELDs, FEDs, and touch panels.

Advantageous Effects of Invention

The antiglare film of the present invention having the above-described structure can sufficiently suppress scintillation and white muddiness, while maintaining excellent hard coat properties and antiglare properties. As a result, the antiglare film can provide display images with a high contrast.

Accordingly, the antiglare film of the present invention is suitably used for cathode-ray tube display devices (CRT), liquid crystal display devices (LCD), plasma display panels (PDP), electroluminescence displays (ELD), field emission displays (FED), electronic paper displays, and the like.

BRIEF DESCRIPTION OF DRAWINGS

FIG. 1 is an explanatory view of a method of measuring θa.

DESCRIPTION OF EMBODIMENTS

Figure 1:
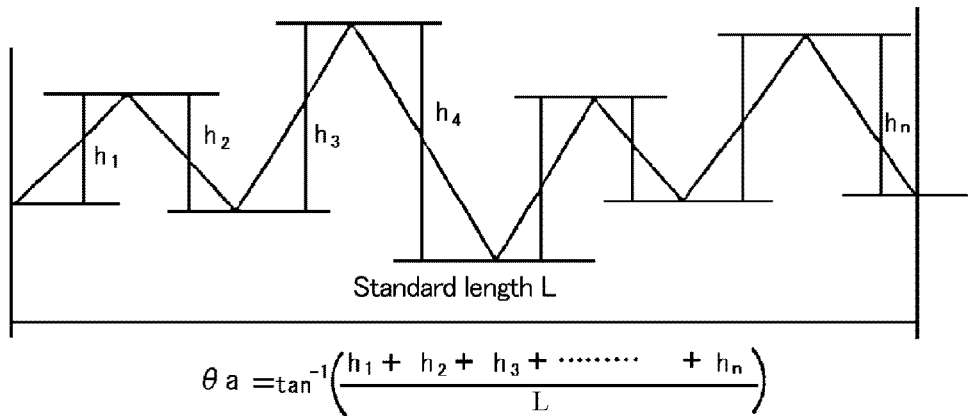

The present invention will be described by means of the following examples which, however, are not intended to limit the scope of the present invention. The terms "part(s)" and "%" are based on mass unless otherwise specified.

Example 1

A light-transmitting substrate (an 60-μm-thick triacetyl cellulose resin film, TD60UL, Fujifilm Corporation) was prepared. A composition for an antiglare layer with the formulation shown below was applied to one side of the light-transmitting substrate to form a coating. Then, the formed coating was dried by flow of dry air at 70° C. at a rate of 0.2 m/s for 15 seconds and then at a rate of 10 m/s for 30 seconds, so that the solvent in the coating was evaporated. By UV light irradiation until the accumulated light quantity reached 50 mJ/cm², the coating was cured to be formed into a 4-μm-thick antiglare layer (after cured). Thus an antiglare film according to Example 1 was prepared.
(Composition for an Antiglare Layer)
  Organic fine particles (hydrophilized acrylic/styrene copolymer particles, average particle size of 2.0 μm, refractive index of 1.55, Sekisui Plastics Co., Ltd.) 3 parts by mass
  Fumed silica (octyl silanized, average particle size of 12 nm, Nippon Aerosil Co., Ltd.) 1 part by mass
  Pentaerythritoltetraacrylate (PETTA) (trade name: PETA, DAICEL-CYTEC Company LTD.) 60 parts by mass Urethaneacrylate (trade name: UV1700B, The Nippon Synthetic Chemical Industry Co., Ltd.) 40 parts by mass
Irgacure 184 (BASF Japan Ltd.) 5 parts by mass
Polyether-modified silicone (TSF4460, Momentive Performance Materials Inc.) 0.025 part by mass
Toluene 105 parts by mass
Isopropyl alcohol 30 parts by mass
Cyclohexanone 15 parts by mass The fumed silica was hydrophilized after substitution of silanol with octyl silyl using a silane compound having octyl (e.g., octylsilane).

Example 2

A composition for an antiglare layer was prepared in the same manner as in Example 1, except that the amount of added organic fine particles was changed to 8 parts by mass. An antiglare film according to Example 2 was produced in the same manner as in Example 1 except that the prepared composition for an antiglare layer was used.

Example 3

A composition for an antiglare layer was prepared in the same manner as in Example 1, except that the amount of added organic fine particles was changed to 1 part by mass. An antiglare film according to Example 3 was produced in the same manner as in Example 1 except that the prepared composition for an antiglare layer was used.

Example 4

A composition for an antiglare layer was prepared in the same manner as in Example 1, except that the amount of added fumed silica was changed to 2 parts by mass. An antiglare film according to Example 4 was produced in the same manner as in Example 1 except that the prepared composition for an antiglare layer was used.

Example 5

A composition for an antiglare layer was prepared in the same manner as in Example 1, except that the used organic fine particles were changed to organic fine particles (hydrophilized acrylic/styrene copolymer particles, average particle size of 2.0 μm, refractive index of 1.515, Sekisui Plastics Co., Ltd.). An antiglare film according to Example 5 was produced in the same manner as in Example 1 except that the prepared composition for an antiglare layer was used.

Example 6

An antiglare film according to Example 6 was produced in the same manner as in Example 1, except that the used composition for an antiglare layer had the following formulation and drying was performed by flowing dry air at 50° C. at a rate of 0.2 m/s for 60 seconds and then flowing dry air at 70° C. at a rate of 10 m/s for 30 seconds.

(Composition for an Antiglare Layer)
Organic fine particles (hydrophilized acrylic/styrene copolymer particles, average particle size of 2.0 μm, refractive index of 1.55, Sekisui Plastics Co., Ltd.) 3 parts by mass
Fumed silica (methylized (subjected to hydrophobization after substitution of silanol with methyl), average particle size of 12 nm, Nippon Aerosil Co., Ltd.) 1 part by mass
Pentaerythritoltetraacrylate (PETTA) (trade name: PETA, DAICEL-CYTEC Company LTD.) 60 parts by mass
Urethaneacrylate (trade name: UV1700B, The Nippon Synthetic Chemical Industry Co., Ltd.) 40 parts by mass
Irgacure 184 (BASF Japan Ltd.) 5 parts by mass
Polyether-modified silicone (TSF4460, Momentive Performance Materials Inc.) 0.025 part by mass
Toluene 120 parts by mass
Isopropyl alcohol 20 parts by mass
Cyclohexanone 20 parts by mass

Comparative Example 1

A composition for an antiglare layer was prepared in the same manner as in Example 1, except that the used fumed silica was methylized (subjected to hydrophobization after substitution of silanol with methyl). An antiglare film according to Comparative Example 1 was produced in the same manner as in Example 1 except that the prepared composition for an antiglare layer was used.

Comparative Example 2

A composition for an antiglare layer was prepared in the same manner as in Example 1, except that fumed silica was not used. An antiglare film according to Comparative Example 2 was produced in the same manner as in Example 1 except that the prepared composition for an antiglare layer was used.

Comparative Example 3

A composition for an antiglare layer was prepared in the same manner as in Example 1, except that fumed silica was not used, the used organic fine particles were acrylic/styrene copolymer particles (average particle size of 2.0 μm, refractive index of 1.55, Sekisui Plastics Co., Ltd.) not subjected to hydrophilization in an amount of 8 parts by mass, and pentaerythritol triacrylate (PETA) (trade name: PETIA, DAICEL-CYTEC Company LTD.) was used instead of pentaerythritol tetraacrylate (PETTA). An antiglare film according to Comparative Example 3 was produced in the same manner as in Example 1 except that the prepared composition for an antiglare layer was used.

Comparative Example 4

A composition for an antiglare layer was prepared in the same manner as in Example 1, except that aluminosilicate particles (average particle size of 2.0 μm, refractive index of 1.50, MIZUSAWA INDUSTRIAL CHEMICALS, LTD.) were used instead of the organic fine particles and the amount thereof was set to 6 parts by mass. An antiglare film according to Comparative Example 4 was produced in the same manner as in Example 1 except that the prepared composition for an antiglare layer was used.

Comparative Example 5

A composition for an antiglare layer was prepared in the same manner as in Example 1, except that pentaerythritol triacrylate (PETA) (trade name: PETIA, DAICEL-CYTEC Company LTD.) was used instead of pentaerythritol tetraacrylate (PETTA). An antiglare film according to Comparative Example 5 was produced in the same manner as in Example 1 except that the prepared composition for an antiglare layer was used.

Reference Example 1

A composition for an antiglare layer was prepared in the same manner as in Example 1, except that the used organic fine particles were changed to organic fine particles (hydrophilized acrylic/styrene copolymer particles, average particle size of 1.0 µm, refractive index of 1.55, Sekisui Plastics Co., Ltd.) and the amount thereof was set to 2 parts by mass. An antiglare film according to Reference Example 1 was produced in the same manner as in Example 1 except that the prepared composition for an antiglare layer was used and the thickness of the antiglare layer after curing was set to 1.5 µm.

Reference Example 2

A composition for an antiglare layer was prepared in the same manner as in Example 1, except that the used organic fine particles were changed to organic fine particles (hydrophilized acrylic/styrene copolymer particles, average particle size of 10 µm, refractive index of 1.55, Sekisui Plastics Co., Ltd.) and the amount thereof was set to 8 parts by mass. An antiglare film according to Reference Example 2 was produced in the same manner as in Example 1 except that the prepared composition for an antiglare layer was used and the thickness of the antiglare layer after curing was set to 13 µm.

The resulting antiglare films according to the examples, comparative examples, and reference examples were evaluated for the following items. Table 1 shows the results.

(Average Spacing (Sm), Arithmetic Mean Roughness (Ra), Average Angle (θa) of Inclination, and Ten Point Mean Roughness (Rz) of Projections and Depressions)

The average spacing (Sm), the arithmetic mean roughness (Ra), and the ten point mean roughness (Rz) of projections and depressions were measured in conformity with JIS B 0601-1994. The average angle (θa) of inclination of projections and depressions was determined by the method shown in FIG. 1. The Sm, Ra, θa, and Rz were measured using a surface roughness measurement device (SE-3400, Kosaka Laboratory Ltd.) under the following conditions.
(1) Probe of Surface Roughness Detection Part
  Model/SE2555N (2µ probe), Kosaka Laboratory Ltd., (tip curvature radius: 2 µm, vertical angle: 90 degrees, material: diamond)
(2) Measurement Conditions of Surface Roughness Measurement Device
  Standard length (cut-off value of roughness curve λc): 2.5 mm
  Evaluation length (standard length (cut-off value λc)×5): 12.5 mm
  Probe sending speed: 0.5 mm/s The cut-off value is usually set at 0.8 mm. In the present invention, however, the cut-off value was set at 2.5 mm for the measurement. The reason for this is as follows: the surface roughness on the antiglare film of the present invention preferably has a shape that enables to prevent reflection of external light and provide a black display of an image display device excellent in gloss blackness (reproducibility of luster black color as if wetted in screen display) as described above. That is, a large and gentle surface roughness is preferable. In order to measure this surface roughness, the cut-off value is preferably set at 2.5 mm.

(Antiglare Properties)

The antiglare properties of the resulting antiglare films were evaluated by visual observation of specimens that were each a stack of a black acrylic plate, a transparent adhesive, and an antiglare film (the adhesive was in contact with the uncoated face). Each specimen was visually observed by 15 viewers in a bright room in accordance with the following criteria to determine whether or not reflections of the viewers and their surroundings disturb image display. The state where reflections of the viewers and their surroundings do not disturb image display refers to a state where the presence of the viewers is noticeable but only the contours of the reflection is unclear and blurry and where the presence of the surrounding objects is noticeable but the contours and boundaries thereof are unclear. In a case where a white wall was present in the surrounding, the state refers to a state where the presence of the white wall is noticeable but the white color is blurry and boundaries of the wall are unclear. Accordingly, blurring the contours of reflections is effective for the viewers not to be disturbed by reflections. Such antiglare properties are different from the conventional antiglare properties that aim to achieve the state where reflections of the viewers or surroundings are not generated at all, completely blurred, or made unclear.
  Excellent: 10 or more viewers found it good.
  Good: 5 to 9 viewers found it good.
  Poor: 4 or fewer viewers found it good.

(White Muddiness)

The white muddiness of the resulting antiglare films was evaluated by sensory evaluation of specimens that were each a stack of a black acrylic plate, a transparent adhesive, and an antiglare film (the adhesive was in contact with the uncoated face). Each specimen was observed in a bright room at a luminance of 1000 Lx under a 30-W three band fluorescent lamp (illuminated at an angle of 45 degrees relative to the sample surface) by 15 viewers in accordance with the following criteria. The sensory evaluation was performed such that the viewer saw the specimen from about 50 cm above at an angle of 45 degrees at the point where the fluorescent lamp was not reflected, to see if it is black without white muddiness.
  Excellent: 10 or more viewers found it good.
  Good: 5 to 9 viewers found it good.
  Poor: 4 or fewer viewers found it'good.

(Scintillation)

The resulting antiglare films were evaluated for scintillation by visual observation of a laminate of a light box with a luminance of 1500 cd/cm$^2$, a black matrix glass with 140 ppi disposed on the box, and an antiglare film disposed on the glass by 15 viewers. Visual observation was performed from various angles such as from left, right, up and down at a distance of about 30 cm. In the visual observation, whether or not scintillation disturbed image display was determined, and the antiglare film was evaluated in accordance with the following criteria.
  Excellent: 10 or more viewers found it good.
  Good: 5 to 9 viewers found it good.
  Poor: 4 or fewer viewers are found it good.

(Contrast Ratio)

In measurement of the contrast ratio, a cold-cathode tube light source equipped with a diffuser, as a back light unit, and two polarizers (AMN-3244TP, SAMSUNG) were used. The luminance $L_{max}$ of light having passed through the polarlizers arranged in parallel Nicol was divided by the illuminance $L_{min}$ of light having passed through the polarizers arranged in crossed Nicols. Thus determined were the contrast ($L_1$) in the case where the antiglare film (light-transmitting substrate+ antiglare layer) was mounted on the outermost surface and the contrast ($L_2$) in the case where only the light-transmitting substrate was mounted on the outermost surface. The contrast ratio was calculated by using the formula ($L_1/L_2$)×100(%).

The luminance was measured with a luminance coloriometer (BM-5A, TOPCON CORP.) in a dark room at a illuminance of not more than 5 Lx. The measurement angle of the luminance coloriometer was set to 1° and the visual field on the sample was set to ϕ5 mm. With respect to the quantity of light from the backlight unit, the backlight unit was set to provide a luminance of 3600 cd/m² when two polarizers were arranged in parallel Nicol without setting a sample.

Excellent: The contrast ratio of not less than 90%.
Good: The contrast ratio of not less than 80% but less than 90%.
Poor: The contrast ratio of less than 80%.

(Pencil Hardness)

The pencil hardness (500 g of load) of the antiglare films was measured in conformity with JIS K-5400 and evaluated in accordance with the following criteria.

Good: Pencil hardness of 2H or more.
Poor: Pencil hardness of less than 2H.

The pencil hardness was measured using a pencil hardness tester (TOYO SEIKI SEISAKUSHO, LTD.). The pencil hardness test was performed 5 times for each film and the hardness of the pencil that did not form any appearance defects such as scratches in at least 4 tests was determined as the pencil hardness of the film. For example, in a case appearance defects were not formed in 4 tests out of 5 pencil hardness tests using a 2H pencil, the pencil hardness of the antiglare films was determined to be 2H.

(Crack)

Each resulting antiglare sheet was wound around a cylinder used in the cylindrical mandrel method for the bending test of JIS K5600-5-1, and evaluated based on formed cracks in accordance with the following criteria.

Good: No crack was formed even when the sheet was wound around an 8-mm cylinder.
Poor: Cracks were formed when the sheet was wound around an 8-mm cylinder.

Figure 2:
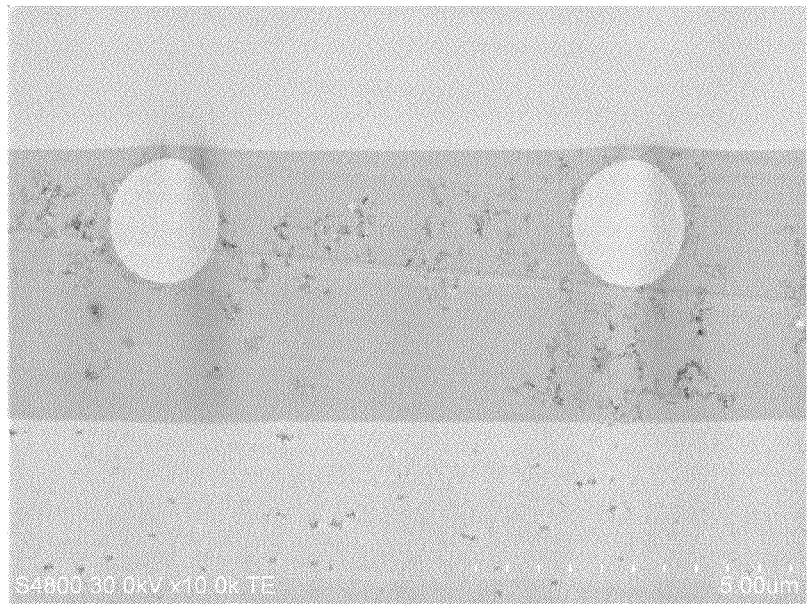
FIG. 2 is a cross-sectional electron microscope picture of an antiglare film according to Example 1.
Figure 3:
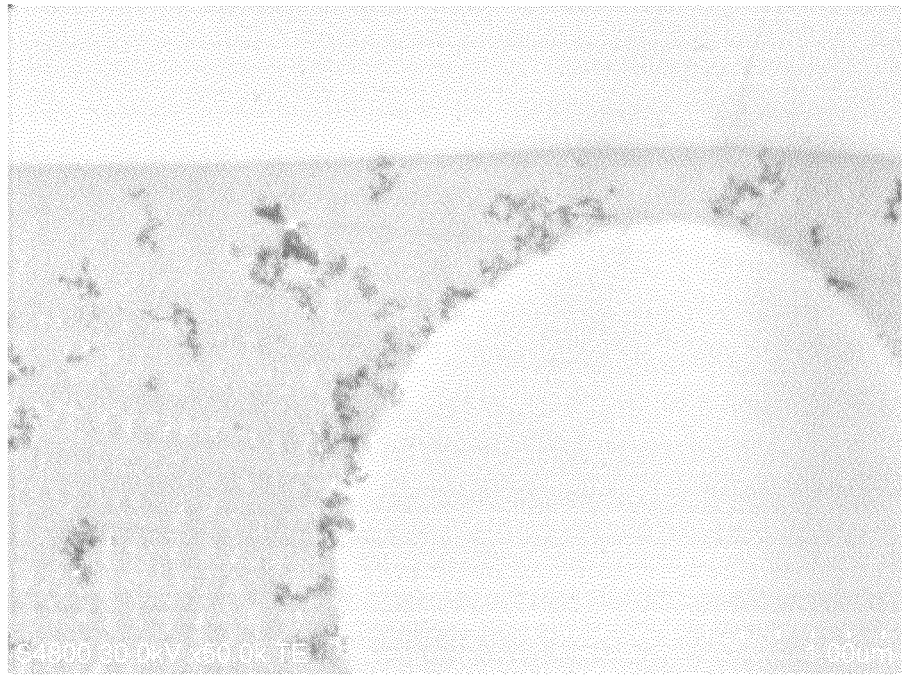
FIG. 3 is an enlarged electron microscope picture of FIG. 2.
Figure 4:
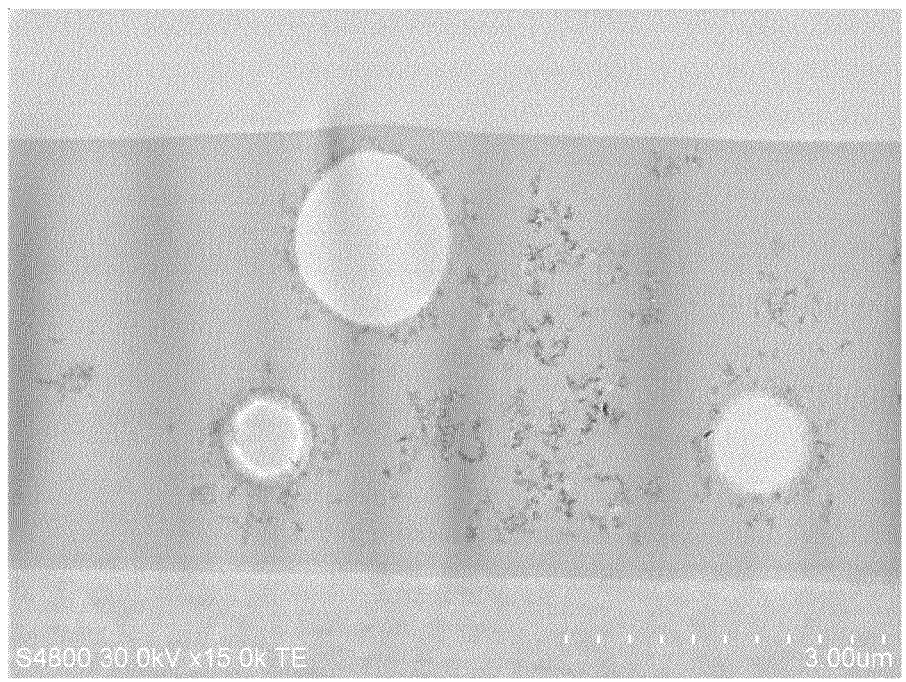
FIG. 4 is a cross-sectional electron microscope picture of an antiglare film according to Example 2.
Figure 5:
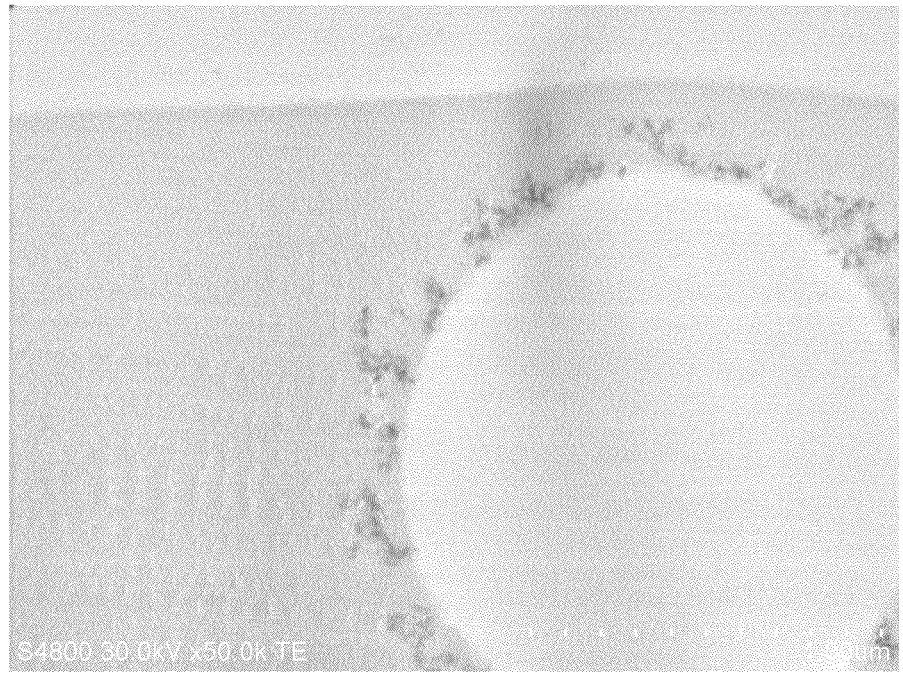
FIG. 5 is an enlarged electron microscope picture of FIG. 4.
Figure 6:
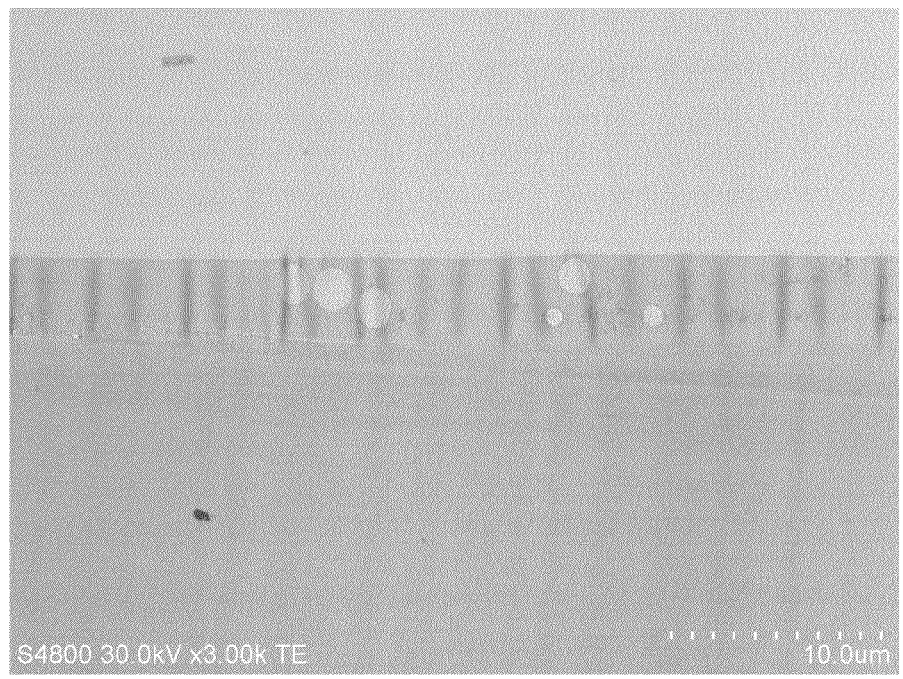
FIG. 6 is an electron microscope picture of FIG. 4 under lower magnification.

Each resulting antiglare film was embedded in an embedding resin and cut with a microtome in a direction orthogonal to the antiglare film to give a 70-nm-thick section. The cross section of the antiglare layer shown in the section was observed using an electron microscope (STEM; S-4800, Hitachi High-Technologies Corporation) to check the state of the fine particles contained in the antiglare layer. In the antiglare layers of the antiglare films according to the examples, silica fine particles were in the form of moniliform agglomerates to be sparsely and densely distributed in the antiglare layer and densely distributed around the organic fine particles. Moreover, the agglomerates of the silica fine particles were attached to the surface of the organic fine particles and some of the silica fine particles impregnated in the agglomerates impregnated the inside of the organic fine particles. The organic fine particles were not agglomerated and moderately gathered in the antiglare layer. FIG. 2 shows a cross-sectional electron microscope picture of the antiglare film according to Example 1. FIG. 3 shows an enlarged microscope picture of FIG. 2. FIG. 4 shows a cross-sectional electron microscope picture of the antiglare film according to Example 2. FIG. 5 shows an enlarged microscope picture of FIG. 4. FIG. 6 shows an electron microscope picture of FIG. 4 under lower magnification to show the state where the organic fine particles moderately gather.

Figure 7:
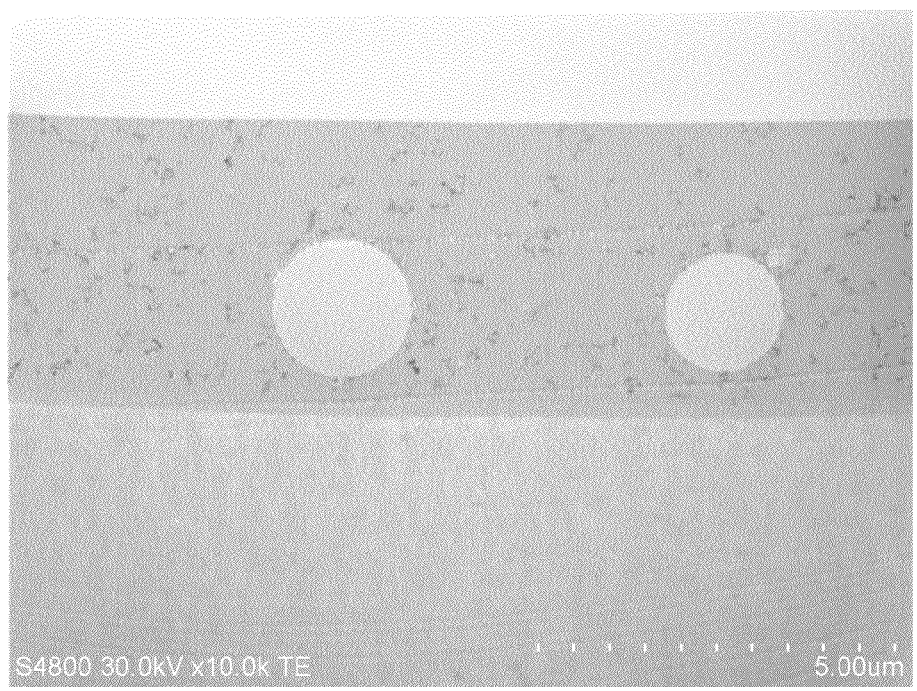
FIG. 7 is a cross-sectional electron microscope picture of an antiglare film according to Comparative Example 1.

In contrast, in the antiglare film according to Comparative Example 1, though the silica fine particles were attached to the organic fine particles, the silica fine particles were not contained in the antiglare layer sparsely and densely. Accordingly, the organic fine particles with the hydrophilized surface could not moderately gather and were dispersed. As a result, the surface roughness was not sufficiently formed on the antiglare layer, providing poor antiglare properties. FIG. 7 shows a cross-sectional electron microscope picture of the antiglare film according to Comparative Example 1. In the antiglare film according to Comparative Example 2, no silica fine particles were contained and the organic fine particles were mono-dispersed in the antiglare layer. As a result, the surface roughness was not sufficiently formed on the antiglare layer, providing poor antiglare properties. In the anti-

TABLE 1

| | Sm (μm) | Ra (μm) | θa (°) | Rz (μm) | Antiglare properties | White muddiness | Contrast ratio | Scintillation | Pencil hardness | Crack |
|---|---|---|---|---|---|---|---|---|---|---|
| Example 1 | 250 | 0.097 | 0.21 | 0.54 | Excellent | Excellent | Excellent | Excellent | Good | Good |
| Example 2 | 222 | 0.143 | 0.35 | 0.82 | Excellent | Good | Excellent | Excellent | Good | Good |
| Example 3 | 402 | 0.069 | 0.14 | 0.35 | Good | Excellent | Excellent | Excellent | Good | Good |
| Example 4 | 192 | 0.083 | 0.20 | 0.48 | Excellent | Excellent | Excellent | Excellent | Good | Good |
| Example 5 | 233 | 0.110 | 0.24 | 0.55 | Excellent | Excellent | Excellent | Good | Good | Good |
| Example 6 | 516 | 0.064 | 0.17 | 0.39 | Good | Excellent | Excellent | Excellent | Good | Good |
| Comparative Example 1 | 350 | 0.030 | 0.08 | 0.28 | Poor | Excellent | Excellent | Excellent | Good | Good |
| Comparative Example 2 | 405 | 0.025 | 0.07 | 0.18 | Poor | Excellent | Excellent | Excellent | Good | Good |
| Comparative Example 3 | 244 | 0.160 | 0.68 | 1.06 | Good | Poor | Poor | Good | Good | Good |
| Comparative Example 4 | 432 | 0.130 | 0.28 | 0.80 | Excellent | Good | Good | Poor | Good | Good |
| Comparative Example 5 | 632 | 0.080 | 0.20 | 0.57 | Good | Good | Excellent | Poor | Good | Good |
| Reference Example 1 | 180 | 0.094 | 0.18 | 0.52 | Excellent | Good | Excellent | Excellent | Poor | Good |
| Reference Example 2 | 456 | 0.112 | 0.23 | 0.64 | Excellent | Good | Excellent | Good | Good | Poor |

Table 1 shows that the antiglare films according to the examples were favorable in all the tests but the antiglare films according to the comparative examples were favorable not in all the tests.

glare film according to Comparative Example 3, no silica fine particles were used and the surface roughness was formed using organic fine particles. Since no silica fine particles were contained, the projections on the surface of the antiglare layer were steep, leading to occurrence of white muddiness and a poor contrast ratio. In the antiglare film according to Comparative Example 4, since no organic fine particles were used, particles were excessively agglomerated to form large projections, leading to occurrence of scintillation. In the antiglare film according to Comparative Example 5, since the used binder resin mainly contained a hydrophilic resin, silica was not densely distributed around the organic fine particles and large agglomerates containing only silica fine particles formed projections, leading to scintillation.

In the antiglare film according to Reference Example 1, though favorable surface roughness was formed, the antiglare layer was too thin, leading to a poor result in the pencil hardness test. In the antiglare film according to Reference Example 2, though favorable surface roughness was formed, the antiglare layer was too thick, leading to a poor result in the crack test. Moreover, the antiglare film according to Reference Example 2 was evaluated lower than the antiglare film according to Example 1 in terms of white muddiness. The reason for this is presumably that, since the organic fine particles in the antiglare film according to Reference Example 1 had a large average particle size relative to the thickness of the antiglare layer, part of the organic fine particles protrudes above the surface of the antiglare layer to generate diffusion light that influenced the white muddiness.

A composition for a low refractive index layer with the following formulation was applied to the surface of the antiglare layer of each of the antiglare films obtained in the examples so as to form a film with a thickness of 0.1 μm after drying (40° C.×1 minute). The film was cured by UV irradiation of 100 mJ/cm² by an UV radiation device (light source H bulb, Fusion UV Systems Japan KK.). Thus a low refractive index layer was produced. An antiglare film having the resulting low refractive index layer was excellent in white muddiness prevention effects.

(Composition for a Low Refractive Index Layer)

Hollow silica fine particles (solid content of the silica fine particles: 20% by mass, solution: methyl isobutyl ketone, average particle size: 50 nm) 40 parts by mass Pentaerythritol triacrylate (PETA) (DAICEL-CYTEC Company LTD.) 10 parts by mass Polymerization initiator (Irgacure127, BASF Japan Ltd.) 0.35 part by mass Modified silicone oil (X22164E, Shin-Etsu Chemical Co., Ltd.) 0.5 part by mass MIRK 320 parts by mass PGMEA 161 parts by mass

INDUSTRIAL APPLICABILITY

The antiglare film of the present invention is suitably used for cathode-ray tube (CRT) display devices, liquid crystal display devices (LCD), plasma display panels (PDP), electroluminescence display devices (ELD), field-emission display devices (FED), touch panels, electronic paper displays, tablet PCs, and the like.

The invention claimed is:

1. An antiglare film comprising:
a light-transmitting substrate; and
an antiglare layer with surface roughness on one face of the light-transmitting substrate,
wherein the antiglare layer contains silica fine particles, organic fine particles, and a binder resin,
part of the silica fine particles form agglomerates and the agglomerates are contained in the antiglare layer sparsely and densely,
the agglomerates of the silica fine particles are densely distributed around the organic fine particles, and part of the agglomerates densely distributed around the organic fine particles are attached to the surface of the organic fine particles and/or have some of the silica fine particles contained in the agglomerates impregnate the inside of the organic fine particles.

2. The antiglare film according to claim 1,
wherein, assuming that the projections and depressions on the surface of the antiglare layer have an average spacing represented by Sm, an average angle of inclination represented by θa, an arithmetic mean roughness represented by Ra, and a ten point mean roughness represented by Rz, all satisfy the following inequalities:
50 μm<Sm<600 μm;
0.1°<θa<1.5°;
0.02 μm<Ra<0.25 μm; and
0.30 μm<Rz<2.00 μm.

3. The antiglare film according to claim 1,
wherein the antiglare layer has a thickness of 2.0 to 7.0 μm.

4. The antiglare film according to claim 1,
wherein the organic fine particles have an average particle size of 20 to 60% relative to the thickness of the antiglare layer.

5. The antiglare film according to claim 1,
wherein the silica fine particles are surface-treated.

6. The antiglare film according to claim 1,
wherein the agglomerates of the silica fine particles have an average particle size of 100 nm to 1 μm.

7. The antiglare film according to claim 1,
wherein the binder resin mainly contains a polyfunctional acrylate monomer including no hydroxy in a molecule.

8. The antiglare film according to claim 1,
wherein the organic fine particles are prepared from at least one material selected from the group consisting of acrylic resins, polystyrene resins, styrene-acrylic copolymers, polyethylene resins, epoxy resins, silicone resins, polyvinylidene fluoride resins, and polyethylene fluoride resins.

9. The antiglare film according to claim 1,
wherein the organic fine particles are surface-hydrophilized.

10. The antiglare film according to claim 1,
wherein the antiglare layer is formed using a composition for an antiglare layer containing the organic fine particles, the silica fine particles, a monomer component of the binder resin, and a solvent.

11. The antiglare film according to claim 10,
wherein the solvent contains isopropyl alcohol.

12. The antiglare film according to claim 11,
wherein the isopropyl alcohol content in the solvent is at least 20% by mass.

13. A polarizer comprising a polarizing element,
wherein the polarizer has the antiglare film according to claim 1, on a surface of the polarizing element.

14. An image display device comprising;
the antiglare film according to claim 1, or a polarizer comprising a polarizing element,
wherein the polarizer has the antiglare film according to claim 1, on a surface of the polarizing element.

* * * * *